M. J. MYERS.
FASTENING DEVICE.
APPLICATION FILED APR. 27, 1912.
1,093,643.
Patented Apr. 21, 1914.
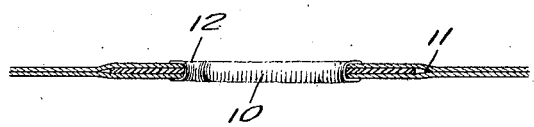
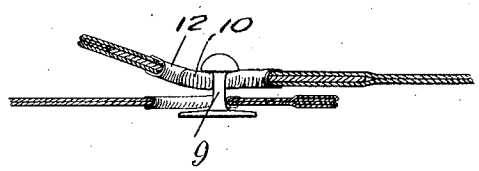
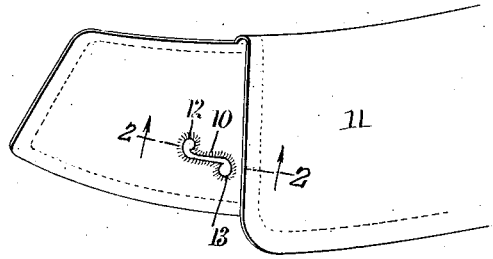
WITNESSES
INVENTOR
Martin J. Myers
BY
ATTORNEYS

UNITED STATES PATENT OFFICE.

MARTIN J. MYERS, OF NEW YORK, N. Y.

FASTENING DEVICE.

1,093,643.  Specification of Letters Patent. Patented Apr. 21, 1914.

Application filed April 27, 1912. Serial No. 693,563.

*To all whom it may concern:*

Be it known that I, MARTIN J. MYERS, a citizen of the United States, and a resident of the city of New York, borough of Manhattan, in the county of New York and State of New York, have invented a new and Improved Fastening Device, of which the following is a full, clear, and exact description.

My invention relates to fastening devices, and it has for its object to provide one which may be used on clothing and other articles, and which is constructed by providing a member with a longitudinally extending slot terminating at its ends in stud openings, one of which extends in the member at one side of the slot and the other extends in the member at the other side of the slot.

Additional objects of the invention will appear in the following complete specification in which the preferred form of the invention is disclosed.

In the drawings similar characters of reference indicate corresponding parts in all the views, in which—

Figure 1 is a view showing my fastening device used on a collar; Fig. 2 is an enlarged sectional view on the line 2—2 of Fig. 1; and Fig. 3 is a similar view, in section, showing how a collar button which is disposed in a slot in another member may also be disposed in a slot shown in the collar illustrated in Figs. 1 and 2 of the drawings.

By referring to the drawings it will be seen that a slot 10 is made in the collar or other member 11, the slot being disposed longitudinally thereof, and stud openings 12 and 13 are formed in the members at the ends of the slot, the stud opening 12 extending above the horizontal plane of the slot 10 and the stud opening 13 extending below the said horizontal plane. When the fastening device is constructed in the manner described, the stud, collar button or other fastening member 9 may be introduced in the stud opening 12 and by pushing the shank of the stud or collar button 9 through the slot 10 the fastening member may be disposed in the stud opening 13 where it remains until it is desired to remove the same.

It is obvious that the fastening device may be made in a member 11 of any desired material, and that it may be used without in any way injuring or destroying the material in which the fastening device is made.

With the construction shown and described, the shank of the stud is readily moved from the stud opening 12 into the downwardly extending stud opening 13, and when it is in the opening 13, it is not apt to be accidentally moved out of that opening as it engages the edge of the fabric below the slot, and owing to the position of the upwardlly extending stud opening, the fabric offers greater resistance to the movement of the stud than it would if the last mentioned stud opening extended any distance below the slot.

Having thus described my invention, I claim as new, and desire to secure by Letters Patent:—

In a fastening device, a fabric member having a longitudinally extending slot, the said slot terminating at one end in a stud opening extending in the fabric member wholly at one side of the slot, the other end of the slot terminating in a stud opening extending in the fabric member wholly at the other side of the slot.

In testimony whereof I have signed my name to this specification in the presence of two subscribing witnesses.

MARTIN J. MYERS.

Witnesses:
EVERARD B. MARSHALL,
PHILIP D. ROLLHAUS.

Copies of this patent may be obtained for five cents each, by addressing the "Commissioner of Patents, Washington, D. C."